United States Patent [19]

Chevance

[11] Patent Number: 5,016,155
[45] Date of Patent: May 14, 1991

[54] HEADLAMP FOR AN AUTOMOTIVE VEHICLE HAVING IMPROVED MEANS FOR RUNNING ADJUSTMENT

[75] Inventor: Gérard Chevance, Torcy, France

[73] Assignee: Valeo Vision, Bobigny Cedex, France

[21] Appl. No.: 573,778

[22] Filed: Aug. 28, 1990

[30] Foreign Application Priority Data

Sep. 7, 1989 [FR] France ............................. 89 11712

[51] Int. Cl.$^5$ .............................................. B60Q 1/02
[52] U.S. Cl. ..................................... 362/418; 362/233; 362/66; 362/285
[58] Field of Search ................. 362/66, 67, 233, 285, 362/287, 418, 421, 61

[56] References Cited

U.S. PATENT DOCUMENTS

| | | | |
|---|---|---|---|
| 4,503,486 | 3/1985 | Makita | 362/61 |
| 4,578,740 | 3/1986 | Krizmanic | 362/66 |
| 4,675,793 | 6/1987 | Capellari et al. | 362/66 |
| 4,731,706 | 3/1988 | Ricard | 362/61 |
| 4,839,785 | 6/1989 | Ohishi | 362/418 |
| 4,845,598 | 7/1989 | Watanabe et al. | 362/418 |
| 4,967,318 | 10/1990 | Ewert et al. | 362/61 |

FOREIGN PATENT DOCUMENTS

| | | |
|---|---|---|
| 3429040 | 2/1986 | Fed. Rep. of Germany ........ 362/66 |
| 3802104 | 8/1989 | Fed. Rep. of Germany . |
| 2488198 | 2/1982 | France .............................. 362/66 |
| 2618108 | 1/1989 | France . |

*Primary Examiner*—Ira S. Lazarus
*Assistant Examiner*—Y. Quach
*Attorney, Agent, or Firm*—Dennison, Meserole, Pollack & Scheiner

[57] ABSTRACT

This invention is concerned with an automotive vehicle headlamp, of the kind comprising a housing, at least one lamp and a reflector mounted in the housing and defining an optical axis, with a closure glass which is substantially inclined with respect to a plane perpendicular to the optical axis. The headlamp also includes means for adjusting the orientation of the reflector by pivoting movement of the latter, at least about a horizontal axis.

The headlamp is characterized in that the said horizontal axis is disposed closely adjacent to the cover glass and substantially parallel to the latter.

The invention is applicable to the reduction of misalignments between the various portions of the light beam and the homologous zones of the glass during adjustment operations.

7 Claims, 2 Drawing Sheets

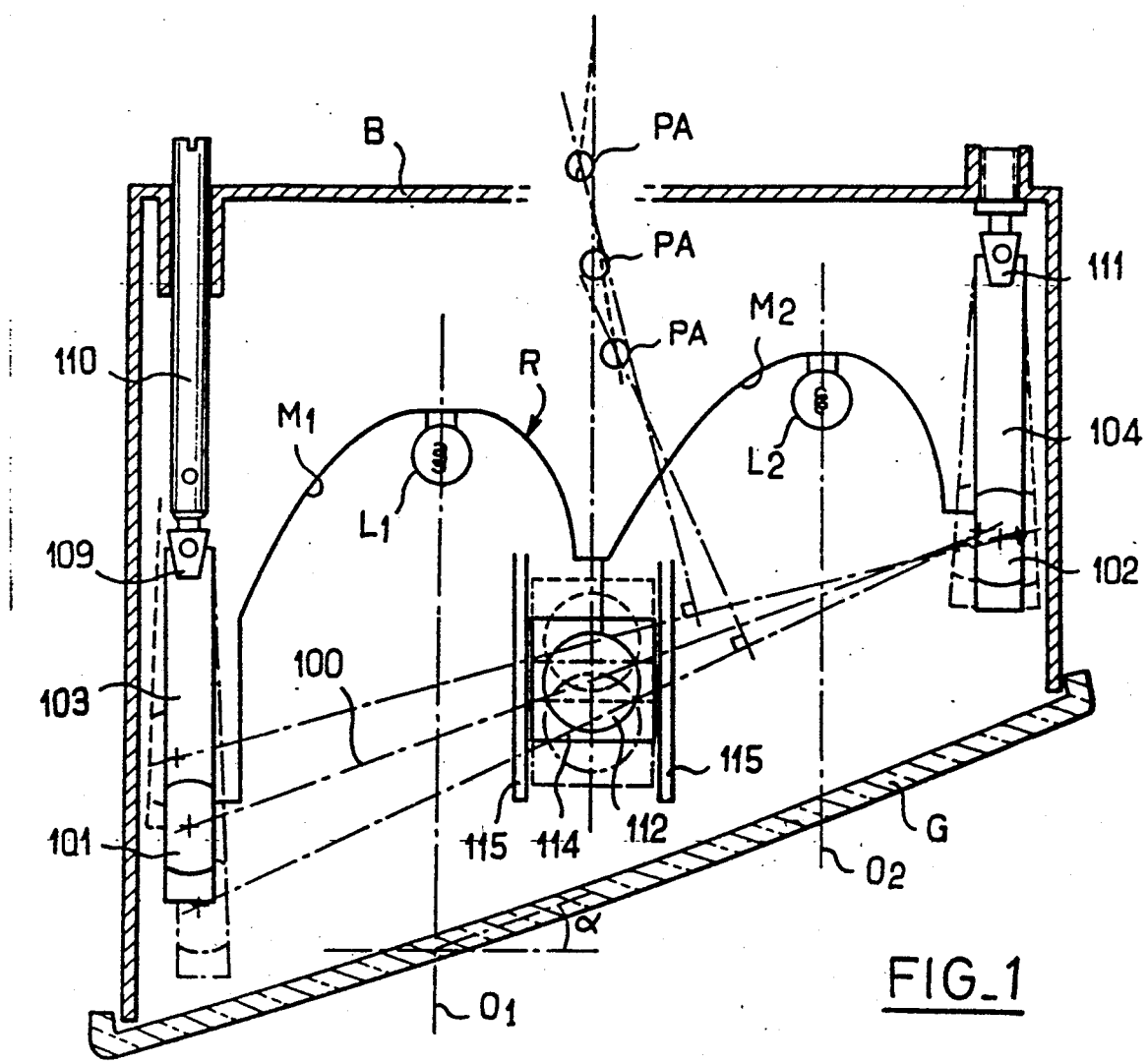
FIG_1
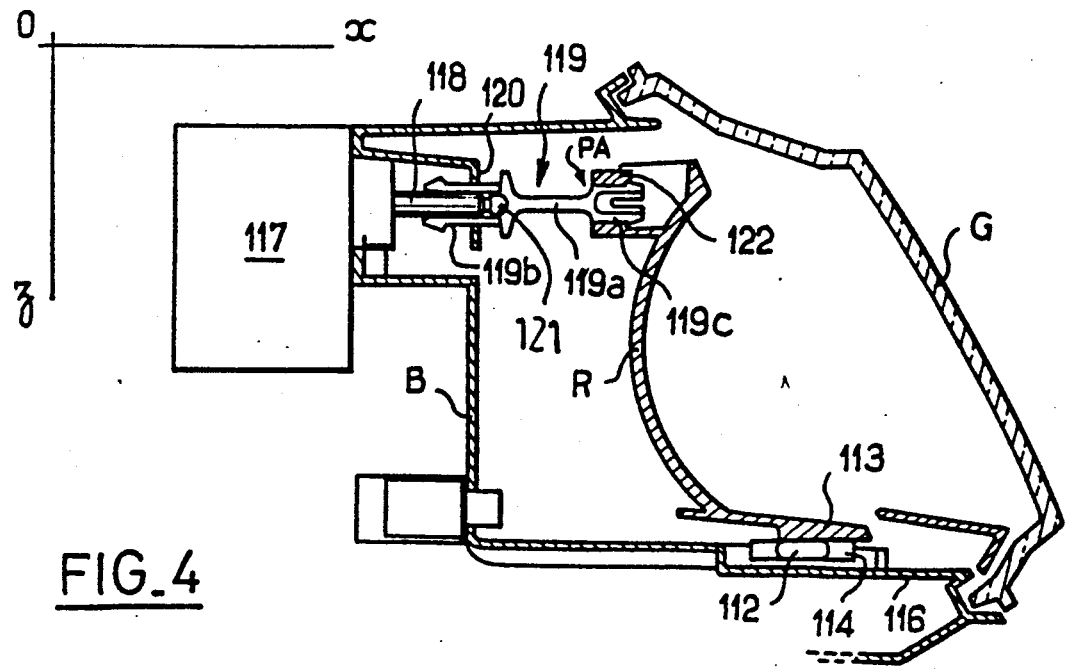
FIG_4

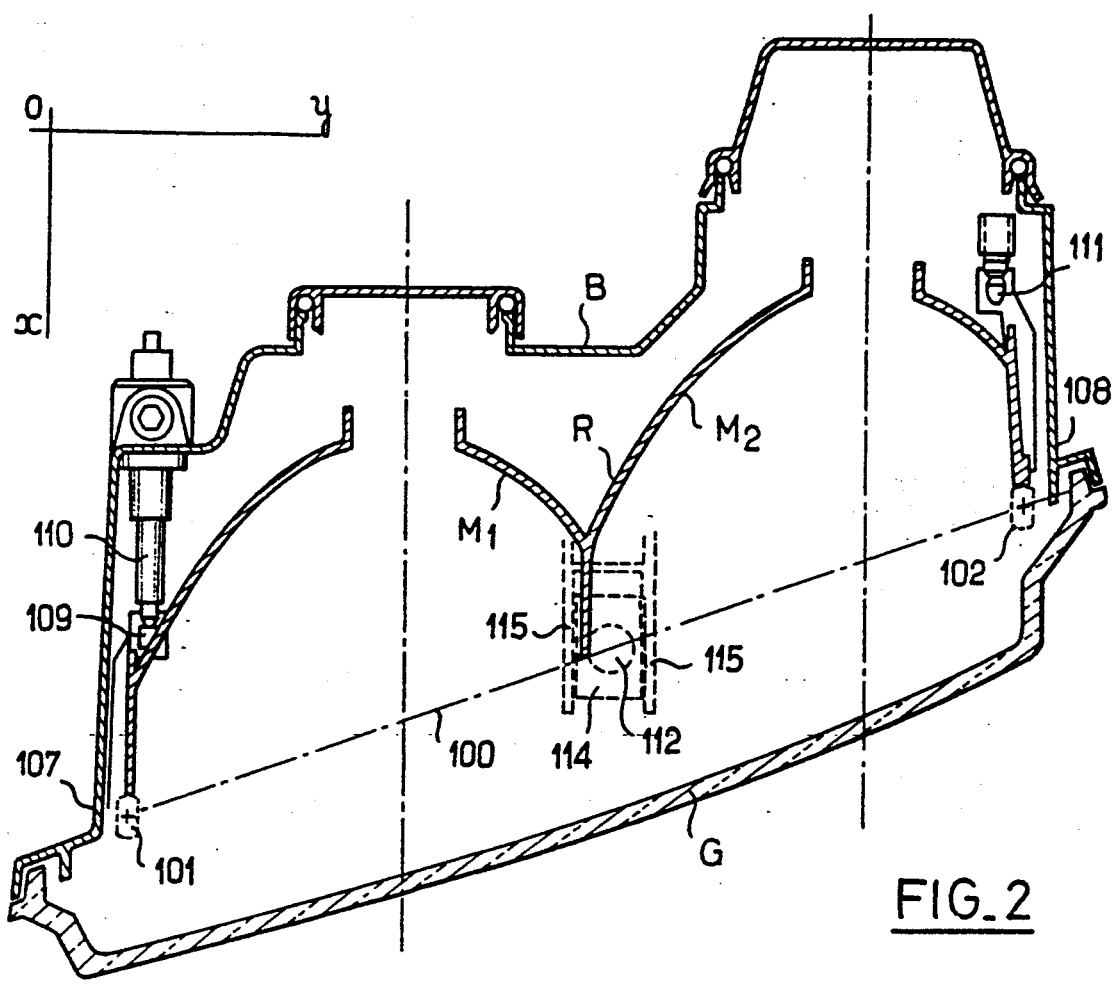
FIG_2
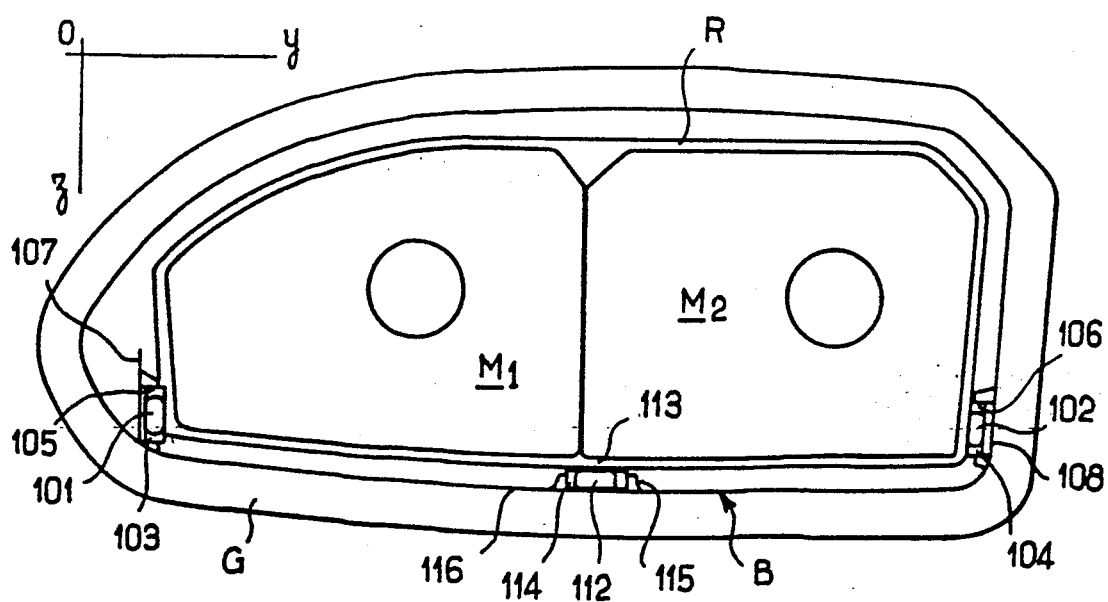
FIG_3

HEADLAMP FOR AN AUTOMOTIVE VEHICLE HAVING IMPROVED MEANS FOR RUNNING ADJUSTMENT

FIELD OF THE INVENTION

The present invention relates to the adjustment of the orientation of headlamps for automotive vehicles.

BACKGROUND OF THE INVENTION

Conventionally, a light beam is adjusted to a desired photometry by forming a beam at source with the reflector, and by then "working" clearly predetermined portions of the beam by the use of prisms or ribs appropriately formed in homologous zones of the glass.

More particularly, though not exclusively, the reflectors of modern headlamps include mathematically defined optical surfaces which allow a light beam of the desired configuration and photometry to be obtained without the intervention of any occulting means. In cooperation with this type of surface, small and carefully predetermined deflections have to be produced by the closure glass of the headlamp in order to confer its final form on the light beam. Thus, with predetermined zones of the reflector, there are associated zones of the glass which are also carefully predetermined and which include elements, having a suitable configuration, for diverting or distributing the luminous flux.

In addition, a headlamp needs to have a facility for changing the direction of the light beam, in respect of its elevation and optionally also in respect of its azimuth without in any way reducing the integrity of the beam. In other words, it is necessary to ensure that as far as possible, during small pivotal movements imparted to the reflector in order to adjust the direction of light emission, the zones of the glass or screen in which light is diverted remain properly aligned with the portions of the beam that are emitted by the associated zones of the reflector, in the absence of which the beam will inevitably be altered.

The well-known optical solution to this problem consists in using an intermediate screen to effect the deviation of the light, the closure glass or lens then being itself, for example, essentially plain. In this case, the screen is mounted rigidly over the opening of the reflector, so that the homologous zones of these two members are always aligned with each other, and the adjustment of orientation is obtained by making them pivot together.

However, situations do exist in which the presence of an intermediate screen is not desirable. This may be for reasons of economy, or of styling, or even for photometric reasons, and this last case applies particularly when it is required that light losses, which may typically be of the order of 10-20%, in the region of the screen are to be avoided. In that case, the light deviating ribs and/or prisms are imposed on the closure glass itself, this being fixed, while the reflector is caused to pivot only for the purpose of adjusting the orientation. This however reintroduces the problem of misalignment referred to above.

Furthermore, this problem is the more considerable since modern headlamps, for styling and aerodynamic reasons, have their cover glass or lens arranged at the transition between the front of the vehicle and the front wing or wheel arch, and are thus steeply inclined with respect to a plane perpendicular to the optical axis: this angle may reach 45 degrees. As a result, at least some zones of the glass are substantially remote from the reflector, and from the axis or axes about which the latter is pivotable, and the adjustment of orientation then causes particularly significant misalignments in these zones, these misalignments being undesirable and being defined between the said zones and the portions of the beam which are to pass through them. The photometry of the beam, as it leaves the glass, is thus excessively changed.

DISCUSSION OF THE INVENTION

An object of the present invention is to overcome the above-mentioned disadvantages of the prior art. To this end, the invention proposes a headlamp for an automotive vehicle, of the kind comprising a housing, a lamp and a reflector, mounted in the housing and defining an optical axis, together with a closure glass which is substantially inclined with respect to a plane perpendicular to the optical axis, and further comprising adjusting means for adjusting the orientation of the reflector by pivoting movement of the latter at least about a horizontal axis, characterised in that the said horizontal axis is disposed in close proximity to the glass and substantially parallel to the latter, being inclined with respect to a plane perpendicular to the optical axis.

In this way, the distance between the horizontal hinge and the cover glass is minimised over the whole extent of the latter, as are any misalignments between the various portions of the light beam and the homologous zones of the glass, so that optical faults are minimised too.

Some preferred additional features of the headlamp in accordance with the invention are given in the remaining paragraphs of this discussion. The said horizontal axis is defined by two knuckles which are fixed with respect to the reflector and which are situated in the opposed side regions of the said reflector, the knuckles being received in complementary sockets in members joined to the housing.

The said members comprise bars which are supported at top and bottom by means of slides formed in side walls of the housing.

It further comprises adjusting means for adjusting the light beam by pivoting movement about a vertical axis, the said adjusting means including a coupling element which is adjustable in length in a direction essentially parallel to the optical axis, and which is arranged between at least one of the said bars and the housing.

The said slides define a lateral clearance for the said bars, a third knuckle being provided, for the lateral retention of the reflector, in the lower region of the reflector, the third knuckle being engaged in a complementary socket of a socket element which is retained laterally in a further slide formed in the lower wall of the housing.

The pivoting movement of the reflector about the horizontal axis is determined by the movement, substantially parallel to the optical axis, of a control pin, and a flexible draw bar is provided between the said control pin and a point of the reflector that is situated substantially in vertical alignment with the said third knuckle.

Means are further provided for enabling the control pin and the flexible draw bar to be automatically coupled to each other and uncoupled from each other.

The automatic coupling and uncoupling means comprise a sliding connection defining limited movement between the draw bar and a member which is fixed with respect to the housing, with a central portion of the control pin determining the adjustment of the reflector, while two end portions of the draw bar determine coupling and uncoupling by engagement of the draw bar on the said member fixed with respect to the housing.

The reflector includes two juxtaposed mirrors each of which includes a respective said lamp.

Further aspects, objects and advantages of the present invention will appear more clearly from a reading of the detailed description which follows, and which discloses a preferred embodiment of the invention, being given by way of non-limiting example only and with reference to the accompanying drawings.

BRIEF DESCRIPTION OF THE DRAWINGS

In the drawings, elements or parts which are identical or similar to each other are indicated by the same reference numerals.

FIG. 1 is a diagrammatic horizontal cross sectional view showing a twin mirror headlamp and illustrating the principle of the invention;

FIG. 2 is a view in horizontal cross section of an actual embodiment of a twin mirror headlamp according to the invention;

FIG. 3 is a view in vertical cross section, taken on the line III—III in FIG. 2; and FIG. 4 is a diagrammatic front view of the headlamp shown in FIGS. 2 and 3.

DESCRIPTION OF A PREFERRED EMBODIMENT OF THE INVENTION

Referring firstly to FIG. 1, this shows in diagrammatic form a vehicle headlamp which includes, in a housing B, two lamps L1 and L2, a single reflector body R which includes two mirrors M1 and M2 arranged side by side and associated respectively with the two lamps, and a closure glass G which closes the front of the housing.

It can be seen in FIG. 1 that the profile of the glass, in horizontal cross section, is substantially inclined with respect to the perpendicular to the optical axes O1 and O2, which are defined respectively by the two assemblies each comprising a lamp and a reflector. The angle of inclination α is of the order of 30 degrees in this example.

The assembly comprising the reflector and the lamps is able to undergo variations in orientation with a view to adjustment or correction of the reference direction of the light beams which are emitted. Typically, means are provided for adjusting these beams in a lateral direction by pivoting about a vertical hinge. This adjustment is carried out on a once-for-all basis after the optical module has been fitted to the vehicle. Means are also provided for carrying out basic adjustment and for correcting the beams in a vertical direction by pivoting about a horizontal hinge, with this correction being achieved, for example, as a function of the variations in the attitude of the vehicle, either manually or by adjustment from the cabin of the vehicle, or automatically.

The glass G includes, in a way not shown, prisms and/or ribs for diversion of the light beams, these being in carefully predetermined locations; and it is clear that the various adjustments and corrections will tend to set up a sweeping action, both horizontally and vertically, of the beams on the glass G. In accordance with the invention, the amplitude of this sweep is limited, that is to say the spacing between the portions of the beams which are normally associated with predetermined light-diverting zones of the glass, on the one hand, and on the other hand these diverting zones themselves. The limitation in this spacing is achieved by generally bringing the horizontal hinge as close as possible to the glass. In addition, given that the height of each mirror depends on the vertical sweep of the glass by the light beam, and that, in a given vertical section, the amplitude of the sweep is proportional to the distance between the horizontal hinge and the glass, the horizontal hinge is, in accordance with the invention, arranged essentially parallel to the glass.

Referring now to all of the Figures of the drawings, preferred means for ensuring the various dispositions and degrees of freedom of the reflector R, which are necessary in relation to the features mentioned above, will now be described. In the drawings, a three-dimensional system of axes x, y and z is shown. The axis x is parallel to the optical axes, while the axis z is vertical and the axis y is perpendicular to the other two axes.

Retention of the reflector R with respect to the axis Z is ensured by making the horizontal hinge (see the line 100 in phantom lines) in the form of two spherical knuckles which are fixed with respect to the reflector R in the lower region of the side edges of the latter, and which are engaged in complementary sockets formed in two bars 103 and 104. The bars 103 and 104 are oriented generally parallel to the axis x, and are able to slide in two horizontal slides 105 and 106, which are formed, for example by moulding, in the inner side surfaces of the housing B, facing each other and indicated at 107 and 108.

At this point it should be noted that the bars 103 and 104, and their slides 105 and 106, are so designed as to prevent any upward or downward movement of the bars and of the knuckles 101 and 102, while allowing them to be displaced to a certain extent in the direction of the axis y. The reason for this will be explained below.

Retention of the reflector R in the direction of the axis x is ensured by the application of the rear ends of the bars 103 and 104 on snap-fit stops, of the kind including a stop nose, which are arranged in line with the bars 103 and 104. A first one of these stop noses, 109, is attached to an adjusting screw 110, for adjusting the beams sideways, while the other stop nose 111 is fastened rigidly to the casing B.

The front edge of the reflector R is substantially parallel to the glass G, with the spherical knuckles 101 and 102 being arranged as close to it as the demands of manufacture will permit. The horizontal hinge 100 is thus arranged along the glass, obliquely with respect to the y direction (typically at an angle of 20–40 degrees with respect to the latter). It follows from the foregoing that, when adjustment of the light beams is made in the lateral direction by adjustment of the screw 110, there is a substantial variation in the frontal disposition of the reflector in the y direction.

It is in order to permit these variations in disposition that, as indicated above, the slides 105 and 106 formed in the housing B do not provide lateral retention of the associated bars 103 and 104. It follows from this that the arrangements described so far similarly do not ensure lateral retention of the reflector R. However, this is obtained by means of a device which includes a third spherical knuckle 112, which is disposed below the lower edge 113 of the reflector R, in the middle of the latter. The knuckle 112 is fixed to the reflector R, and is engaged in a socket element 114. This socket element 114 is guided, virtually without any clearance, in the direction of the axis x by means of a slide 115. The slide 115, which may for example be formed by moulding, is formed in the lower wall 116 of the housing B. In addition, in this present example, the centre of the spherical knuckle 112 is not disposed on the horizontal hinge line 100, as can clearly be seen from FIG. 3; and the slide 115 is so designed as to permit the socket element 114 to undergo a limited amount of vertical displacement, given that the adjustment of the height of the beams, by pivoting about the hinge 100, will produce small variations in height in the knuckle 112 and its socket element 114.

In FIG. 1, three positions, indicated respectively in phantom lines, full lines and broken lines, are indicated for the spherical knuckles 101, 102 and 112, for the bars 103 and 104, and for the socket element 114. These three positions correspond to three different laterally adjusted positions of the light beams, the spacings between these positions being exaggerated in the Figure for clarity.

Adjustment of the light beams for height is obtained by action on the reflector R in the upper region of the latter, for example, and as shown, vertically in line with the knuckle 112. In the present example, a correcting device 117 is provided. This is mounted rigidly on the rear face of the housing B, and comprises an adjusting-/correcting pin 118 which is displaced, for example under the action of an electric motor, not shown, or by manual control. Alternatively it may be displaced by means of a suitable device which is controlled from within the cabin of the vehicle. This displacement takes place in the direction of the axis x, FIG. 4.

While adjustment or correction for height is taking place, any point on the reflector R, and in particular the point PA at which the adjusting force is applied, is displaced in a plane which is perpendicular to the horizontal hinge 100; in addition, the orientation of the hinge 100 varies in accordance with the transverse adjustment that has been carried out. In this connection, FIG. 1 shows diagrammatically the progress of the position of the application point PA on the reflector, indicated by a circle, as a function of the progress of width-wise or transverse adjustment of the light beams.

It will therefore be understood that an appropriate degree of freedom has to be ensured, essentially in the y direction, between the height adjusting pin 118 and the point at which this pin acts on the reflector R. This degree of freedom is preferably obtained using a flexible draw bar 119 which is arranged between the free end of the adjusting pin 118 and the application point PA of the reflector.

It may be noted here that, due to the various clearances which are given to the knuckles, namely a lateral clearance for the knuckles 101 and 102, and a vertical clearance for the knuckle 112, and due also to a clearance which exists by virtue of the resilient deformability of the flexible draw bar 119, the various adjustments in the orientation of the reflector impose no constraint on the reflector itself. In this way, any risk of buckling, fracture etc. of the reflector is avoided.

In addition, and in accordance with a subsidiary feature of the present invention, means are provided for permitting automatic coupling and uncoupling between the rigid pin 118 of the correcting device 117 and the flexible draw bar 119 while the correcting device 117 is being fitted at the back of the housing B or removed from the latter. This is desirable because in the present case it is not possible to work by hand from outside the housing B. To this end, the draw bar 119 comprises a single member, comprising, integrally a central body portion 119a, at the rear end of which a number of flexible gripping fingers 119b extend backwardly. These allow the draw bar to be attached by a snap fit and to be displaced in the direction of the axis x with respect to a small vertical plate 120 which is fixed to the housing B. The coupling between the pin 118 and the draw bar 119 is obtained through a spherical knuckle 121, which is provided at the free end of the pin 118 and which engages in a complementary socket formed in the rear end of the body portion 119a between the gripping fingers 119b. In addition, the draw bar 119 includes at its front end a set of flexible toe portions 119c, which engage in a connecting bush 122 formed at the rear of the reflector R.

During the coupling operation, the draw bar 119 is retained by its gripping fingers 119b on the plate 120, and the ball 121 of the pin 118 can engage in its socket in the draw bar, by elastic deformation of the material which defines this socket. To this end the plate 120 is arranged to allow the pin 118 to pass between the gripping fingers 119b. On uncoupling, the draw bar 119 engages on the plate 120 through a rear surface of its body portion 119a, and the ball 121 is then able to separate from its socket. It should be noted that the rigid connections between the draw bar 119 and pin 118, and between the draw bar 119 and the connecting bush 122 of the reflector, which are provided for alignment purposes during assembly, will prevent the draw bar from being able to deform elastically, except in a central section which essentially corresponds to its central body portion 119a.

As has been indicated above, the adjustment of the light beams in the lateral direction is effected by adjustment of the screw 110 in an essentially permanent manner, the amount of adjustment being accurately determined and relatively small. By contrast, the degree of adjustment of the rigid adjusting pin 118 of the correcting device 117 may be determined in practice by adding together: the degree of correction (i.e. manual or automatic correction, particularly as a function in variations in the attitude of the vehicle); the amount of adjustment of the light beams at source (determining the absolute position of the angular range covered by the correction); a degree of adaptation due to the incidence of the lateral adjustment; and finally an additional amount of backward adjustment for allowing the pin 118 to be uncoupled from the flexible draw bar 119.

The present invention is of course in no way limited to the particular embodiment described above and shown in the drawings, and a person skilled in the art will have sufficient knowledge to be able to apply to it, within the spirit of the invention, any appropriate variation or modification. In particular, given that the above description is concerned with a twin mirror type of headlamp, the invention will of course be understood to be applicable also to single mirror headlamps.

What is claimed is:

1. A headlamp for an automotive vehicle comprising a housing including means defining opposed side walls, a reflector mounted in the housing between said side walls, at least one lamp mounted in the housing and defining with the reflector an optical axis, and a closure glass mounted on the front of the housing and being substantially inclined with respect to a plane perpendicular to the said optical axis, the headlamp further comprising pivot means mounting the reflector in the housing and defining at least a horizontal axis, and adjusting means for adjusting the orientation of the reflector by pivoting movement of the latter at least about the said horizontal axis, said adjusting means including first and second knuckles fixed with respect to the reflector and positioned adjacent said opposed side walls of said housing, and means defining respective sockets connected with the housing, the said knuckles being received respectively in the said sockets and together defining the said horizontal axis, the said pivot means being disposed in the housing so as to define the said horizontal axis closely adjacent to the closure glass, substantially parallel to the latter, and inclined with respect to a plane perpendicular to the optical axis; and means defining slides formed in said side walls, with the said means comprising sockets for said first and second knuckles in the form of bars retained in said slides.

2. A headlamp according to claim 1, wherein the reflector further comprises two juxtaposed mirrors, each of which carries a said lamp.

3. A headlamp according to claim 1, further comprising means mounting the reflector in the housing pivotally so as to define a vertical pivot axis thereof, and adjusting means for effecting such pivoting movement whereby to adjust the light beam, the said adjusting means including a coupling member arranged to have a variable effective length in a direction essentially parallel to the optical axis and coupling at least one of the said bars with the housing.

4. A headlamp according to claim 3, wherein the said slides define a lateral clearance for the said bars, the housing having a lower wall, and the headlamp further comprising a further slide formed in the said lower wall, a socket element retained laterally in the said further slide and having a socket, and a third knuckle engaged in the socket of the said socket element in the lower region of the reflector for retaining the reflector laterally.

5. A headlamp according to claim 4, further comprising a control pin, means mounting the control pin in the housing for movement substantially parallel to the optical axis, and a flexible draw bar defining an application point by which it is engaged on the reflector, the said application point being arranged substantially in vertical alignment with the said third knuckle, whereby pivoting movement of the reflector about the said horizontal axis is determined by the said movement of the control pin.

6. A headlamp according to claim 5, further comprising means associated with the said control pin and flexible draw bar, for effecting automatic coupling and uncoupling between the said pin and draw bar.

7. A headlamp according to claim 6, wherein the said automatic coupling and uncoupling means comprise a fixed element which is fixed with respect to the housing, and coupling means coupling the draw bar with the said fixed element for limited relative sliding movement between them, the control pin having a central portion determining adjustment of the reflector, and the draw bar having two end portions which cause the said coupling and uncoupling to take place by engagement of the draw bar on the said fixed element.

* * * * *